March 24, 1959  I. F. SCHRECK  2,878,884
FRONT WHEEL DRIVE TOW TRACTOR
Filed July 24, 1952  2 Sheets-Sheet 2
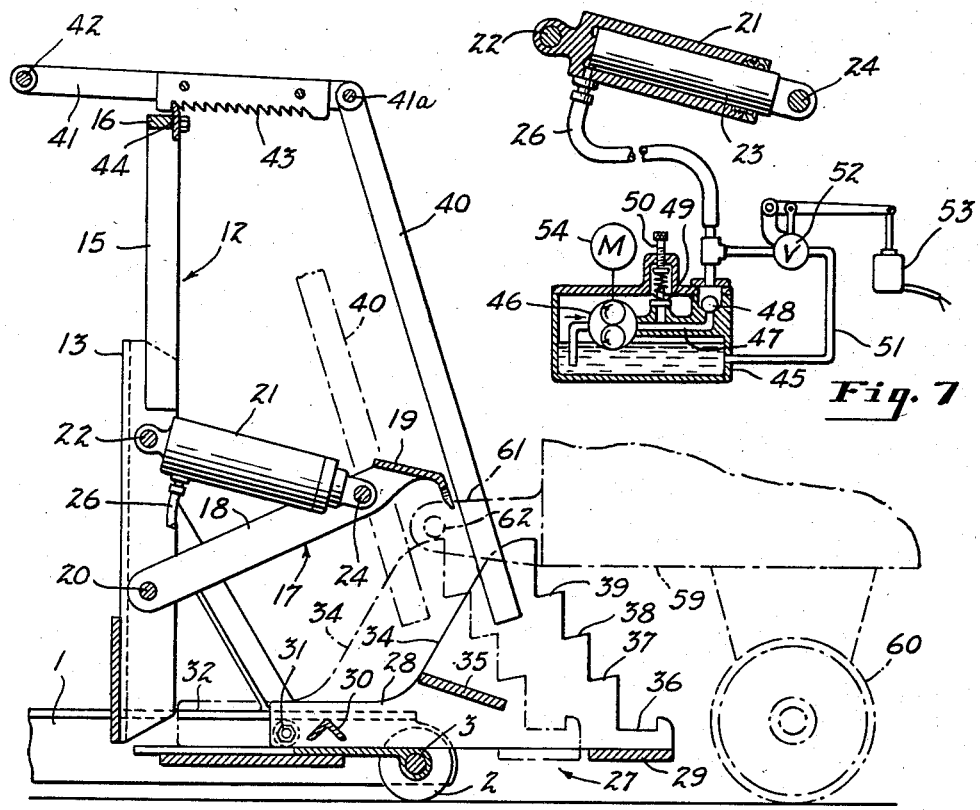
Fig. 5
Fig. 7
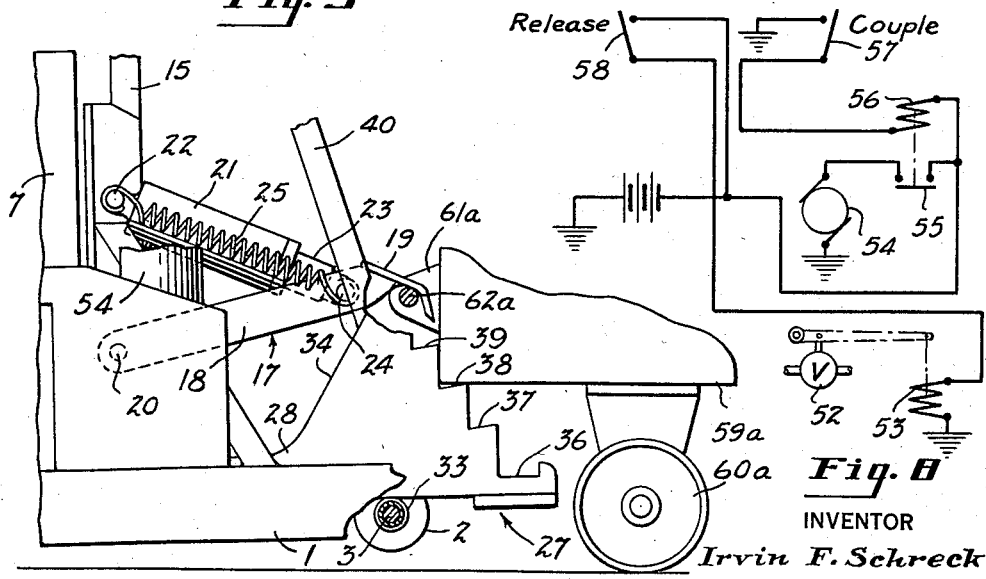
Fig. 6
Fig. 8
INVENTOR
Irvin F. Schreck
BY Evans & McCoy
ATTORNEYS United States Patent Office 2,878,884
Patented Mar. 24, 1959

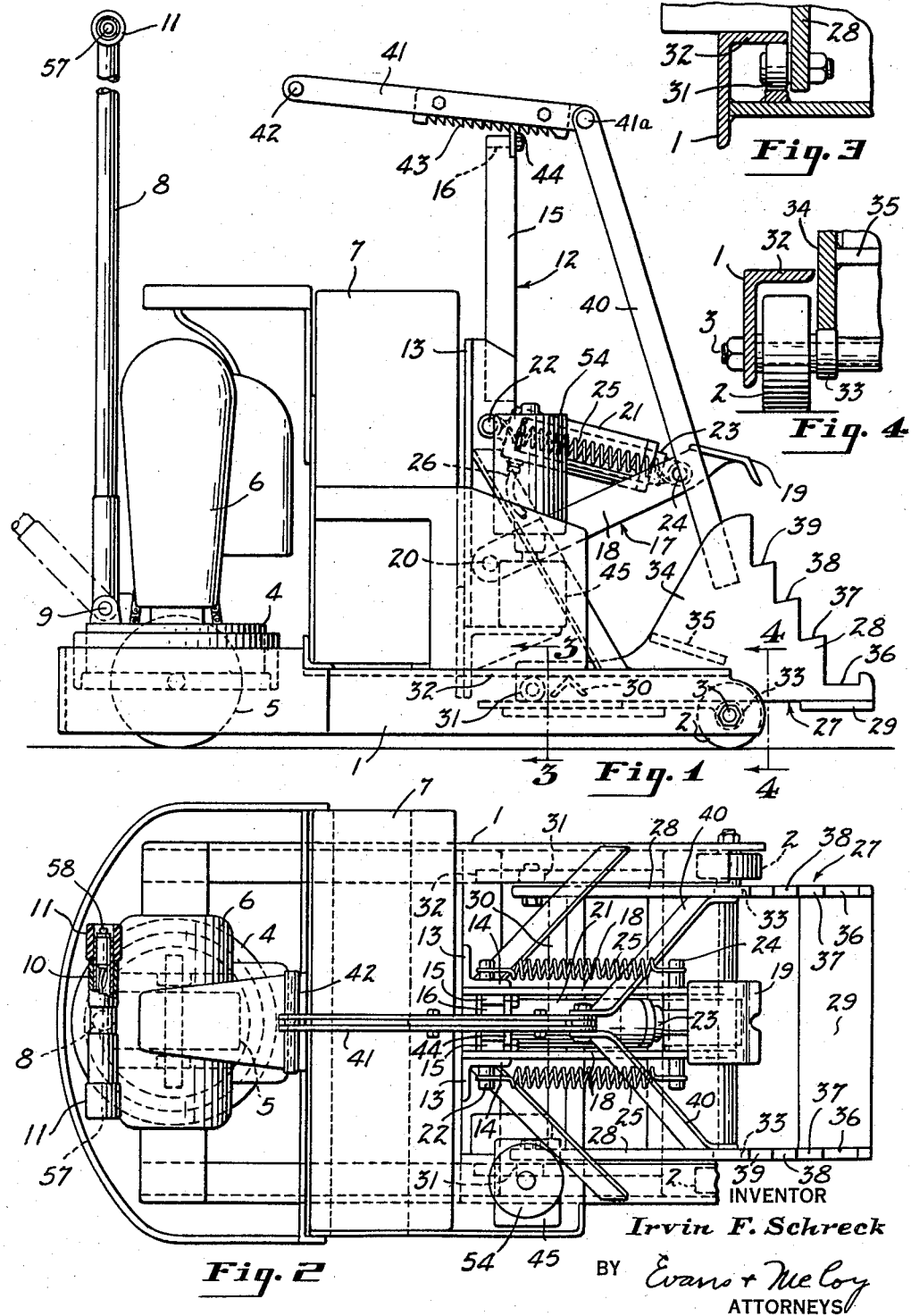

2,878,884

FRONT WHEEL DRIVE TOW TRACTOR

Irvin F. Schreck, Cleveland Heights, Ohio

Application July 24, 1952, Serial No. 300,604

5 Claims. (Cl. 180—12)

This invention relates to tow tractors of the type having a single swiveled steering traction wheel at its front end and particularly to a tractor of the character referred to that has a grappling mechanism by means of which it may be attached to trailers of various sizes and shapes.

The tractor of the present invention is provided with a rearwardly projecting trailer grappling member that is normally held in an elevated position on the tractor frame by counter-balancing means such as a spring and that is moved downwardly into engagement with a trailer by suitable actuating means such as a cylinder and piston interposed between the grappling member and the tractor frame. The actuating means connected to the tractor frame and grappling member exerts a downward thrust on the engaging portion of the grappling member and applies a force to the tractor frame that lifts the rear end of the frame when the downward movement of the grappling member is arrested by engagement with a trailer, the weight of the rear end of the tractor being transferred from the rear supporting wheels to the grappling member when the downward movement of the grappling member is arrested by engagement with a part of the trailer, the grappling member supporting the rear end of the tractor with its rear wheels clear of the ground while it is held by the retracting means against upward movement with respect to the tractor frame.

The tractor is also preferably provided with stabilizing stop members that engage with a trailer frame or body in such manner as to limit the upward movement of the rear end of the trailer and to hold the tractor against lateral rocking movements with respect to the trailer during travel of the tractor and trailer. The stop members are preferably mounted for adjustment forwardly and rearwardly and are stepped longitudinally to provide portions of different heights for engagement with the undersides of trailer frames or bodies that are at different heights. The longitudinally stepped adjustable stops are transversely spaced and on opposite sides of the grappling lever so that they hold the tractor against lateral rocking movements with respect to the trailer.

The invention has for an object to provide a tow tractor with a simple ruggedly constructed grappling mechanism by means of which the trailer can be quickly attached to and released from trailer vehicles of various sizes and shapes.

Another object is to provide a grappling mechanism that is so actuated that the weight of the rear end of the tractor is transferred to the grapple and through the grapple to the trailer upon engagement of the grapple with the trailer, the rear supporting wheels of the tractor being lifted off the ground and held out of contact with the ground while the trailer is being towed by the tractor.

A further object of the invention is to provide stabilizing stops on the tractor frame which are adjustable for engaging with the undersides of the frames or bodies of trailer vehicles of various sizes and shapes which serve to limit the height to which the rear end of the tractor is lifted and to hold the tractor against lateral rocking movements after it is coupled to the trailer.

Reference should be had to the accompanying drawings forming a part of this specification in which:

Figure 1 is a side elevation of a tow tractor embodying the invention;

Fig. 2 is a top plan view of the tractor;

Fig. 3 is a fragmentary section taken on the line indicated at 3—3 in Fig. 1;

Fig. 4 is a fragmentary section taken on the line indicated at 4—4 in Fig. 1;

Fig. 5 is a fragmentary side elevation with parts of the tractor shown in vertical section, the tractor being shown with its grappling means positioned for engagement with a trailer;

Fig. 6 is a fragmentary side elevation showing the tractor attached to a trailer;

Fig. 7 is a diagrammatic view showing the hydraulic grapple actuating mechanism; and Fig. 8 is a wiring diagram showing the electric control for the grappling mechanism.

In the accompanying drawings a front wheel drive tractor is shown which is provided with a supporting frame 1 that has rear supporting wheels 2 that are mounted on opposite ends of an axle 3 that extends transversely across the rear end of the frame. Adjacent its forward end the frame 1 has a turntable 4 in which a steering tractor wheel 5 is journaled. The turntable 4 turns about a vertical axis so that the tractor wheel may be swung angularly to steer the tractor. The turntable 4 carries a housing 6 for a motor (not shown) that drives the wheel 5, current being supplied to the motor from a storage battery in a battery box 7 mounted on the frame 1 adjacent to and rearwardly of the turntable 4. A steering handle 8 is connected by a horizontal pivot 9 to the turntable 4 and is provided with hand grips 10 at its outer end which carry sleeves 11 which may be turned to control the propelling motor as in my Patent 2,209,356 granted July 30, 1940. An operator steers the tractor by means of the handle 8 and by turning the motor controlling sleeves 11 forwardly or rearwardly he may cause the truck to be propelled forwardly or rearwardly while he steers it.

The rear end of the tractor carries a trailer grappling mechanism which can be operated to simultaneously attach the tractor to a trailer and lift the rear end of the tractor off the ground. In the embodiment of the invention herein shown a standard 12 is mounted on the tractor frame 1 centrally thereof and rearwardly of the battery box. The standard 12 has spaced vertical angle bars 13, the flanges 14 of which have opposed parallel inner faces. The standard 12 has an extension formed by two flat bars 15 attached to the inner faces of the flanges 14, the top ends of the bars 15 being connected to a horizontal spacer 16. The standard 12 provides a support for a rearwardly extending grappling member in the form of a lever 17 that is composed of two parallel flat bars 18 and a trailer engaging hook 19 that is attached to the rear ends of the bars 18. The lever 17 is connected to the standard 12 by a horizontal pivot 20, the bars 18 being positioned between the flanges 14 in engagement with the inner faces thereof. For actuating the lever 17 a fluid pressure cylinder 21 is provided that is connected to the standard 12 by a pivot pin 22 and that has a piston 23 that is connected to the lever 17 adjacent its rear end by a horizontal pivot pin 24. The cylinder 21 is connected to the pivot pin 22 between the flanges 14 of the standard and the piston 23 is connected to the pivot pin 24 between the bars 18, the bars 18 being spaced apart sufficiently to receive the cylinder 21 between them. The pivot pin 22 projects through the flanges 14 of the standard and the pivot pin 24 projects through the lever side bars 18 and counter-balancing springs 25 are attached at their opposite ends to the projecting ends of the pivots 22 and 24. The springs 25 serve to normally hold the lever 17 in an elevated position and the piston 23 in fully retracted position in the cylinder 21. When fluid under pressure is admitted to the forward end of the cylinder 21 through a supply conduit 26, downward thrust is exerted on the lever 17 to swing it downwardly in opposition to the springs 25 and, when the movement of the lever 17 is arrested by engagement with a trailer frame or body, the fluid pressure acting through the cylinder and piston exerts lifting force on the rear end of the tractor, transferring the weight of the rear end of the tractor to the lever 17 and through the lever 17 to the trailer and lifting the rear end of the tractor to a position where the rear wheels 2 are clear of the ground. While pressure is maintained in the cylinder 21 the tractor will be coupled to the trailer through the hook 19 and the rear end of the tractor will be supported on the trailer with its rear wheels clear of the ground.

In order to prevent excessive lifting of the rear end of the tractor and to prevent lateral rocking of the tractor while towing the trailer, trailer engaging means in addition to the grappling and lifting lever is preferably provided. Lift limiting and tractor stabilizing stop means is provided on a slide 27 mounted for forward and rearward movement in the frame 1. The slide 27 projects beyond the rear end of the tractor frame and has side plates 28 that are connected by rear and front crossbars 29 and 30. Adjacent their forward ends the plates 28 have axially alined rollers 31 that bear against overhanging flanges 32 on the side bars of the frame 1. At the rear end of the frame 1 the slide 27 is supported on rollers 33 mounted on the axle 3. The plates 28 have upwardly extending portions 34 that are connected by a crossbar 35, and that are formed to provide steps 36, 37, 38 and 39 of progressively greater height forwardly from the rear ends of the plates for engagement with the under sides of trailer frames or bodies.

Upwardly extending converging bars 40 are attached at their lower ends to the upwardly projecting portions 34 of the plates. An actuating bar 41 is pivoted at 41a to the upper ends of the bars 40 and extends rearwardly over the top of the standard 12. Handgrips 42 are provided at the forward end of the bar 41 and the underside of the bar 41 is provided with ratchet teeth 43 which engage with a tooth 44 mounted on the spacer 16 at the top of the standard 12 to prevent movement of the slide 27 rearwardly from a position to which it has been manually adjusted but which permits the slide to be moved forwardly by engagement of the stepped stop members with a trailer frame or body.

As best shown in Fig. 7, a liquid storage tank 45 is provided from which liquid may be pumped to the actuating cylinder 21. A pump 46 is provided in the tank 45 which delivers liquid through a conduit 47 and a check valve 48 to the conduit 26 leading to the cylinder 21. Within the tank the conduit 47 is provided with a pressure operated relief valve 49 that is opened to discharge liquid from the conduit into the tank when the pressure exceeds a predetermined amount. The valve 49 serves to limit the pressure delivered to the cylinder 21 and is provided with suitable adjusting means such as the spring backing screw 50 to vary the pressure required to open it. A bypass conduit 51 connects the conduit 26 with the tank 45 and a normally closed valve 52 in the conduit 51 is actuated by a solenoid 53 to drain liquid from the cylinder 21 back into the tank 45 and permit the grappling lever 17 to be returned to its elevated position.

An electric motor 54 shown diagrammatically in Fig. 8 drives the pump 46 and is controlled by a switch 55 that is operated by a solenoid 56. Push button switches 57 and 58 mounted in opposite ends of the handle 10 control the motor 54 and the pressure releasing valve 52.

To attach the tractor to a trailer the tractor is positioned as shown in Fig. 5 of the drawings, with its grappling hook 19 positioned above a portion of the trailer frame or body with which it is adapted to provide a towing connection. The push button 57 is then operated to close the circuit in the motor 54 to drive the pump 46 for a sufficient length of time to engage the grappling lever with the trailer and lift the rear end of the tractor. When the switch 57 is released the pump is stopped and the pressure is maintained in the cylinder 21 by means of the check valve 48.

When it is desired to release the trailer the push button switch 58 is closed to energize the solenoid 53 and open the valve 52 to drain the liquid from the cylinder 21. As the downward thrust on the lever 17 is released the rear end of the tractor is lowered into engagement with the ground and the counterbalance springs 25 return the lever 17 to its elevated position clear of the trailer.

When the tractor is to be attached to a trailer it is backed into a position where the hook 19 directly overlies the portion of the trailer with which it is to be engaged and the slide 27 is adjusted to position the desired steps on the slide 27 beneath a portion of the trailer body or frame so that upward movement of the rear end of the tractor will be stopped with the rear wheels 2 at the desired distance above the ground.

The hook 19 may be engaged with any rigid portion of a trailer frame or body that will provide a towing connection. In Figs. 5 and 6 trailers are shown which have coupling members attached to their forward ends.

In Fig. 5 a portion of a trailer is shown that has a body or frame 59, supporting wheels 60, a coupling bracket 61 and a coupling bar 62. As shown in this view, the hook 19 is positioned directly over the bar 62 with which it is to engage and the slide 27 is positioned with its steps 39 beneath the body 59 of the trailer. Application of pressure to the cylinder 21 will move the hook 19 downwardly into engagement with the trailer bar 62 and further movement of the piston 23 will lift the rear end of the tractor until the steps 39 engage with the underside of the body 59 of the trailer.

Fig. 6 of the drawings shows the tractor attached to a trailer that differs somewhat in construction from the trailer shown in Fig. 5. In Fig. 6 the trailer has a body 59a, wheels 60a, a coupling bracket 61a and a coupling bar 62a. Since the body 59a is lower than the body 59 and the bracket 61a is shorter than the bracket 61, the slide 27 is positioned with its steps 38 engaging the underside of the trailer body 59a.

The plates 28 of the slide 27 are spaced apart substantially the full width of the tractor frame and engage the trailer frame or body at substantial distances on opposite sides of the hook 19 so that the adjustable stops serve not only to limit the upward movement of the rear end of the tractor, but also to clamp the tractor to the trailer in such manner as to hold the tractor against the lateral rocking movements with respect to the trailer while the trailer is being towed.

It is to be understood that in accordance with the provisions of the patent statutes, variations and modifications of the specific devices herein shown and described may be made without departing from the spirit of the invention.

What I claim is:

1. A tow tractor comprising a frame, transversely spaced supporting wheels mounted in the frame adjacent its rear end and a steering traction wheel swiveled in the frame adjacent its forward end to swing about a vertical axis, a trailer grappling member mounted on said frame for vertical movement and overlying the rear end of said frame, counterbalancing means for normally holding said member in an elevated position, actuating means connected to said grappling member and to said frame to transmit opposing thrusts thereto and operable to exert a downward thrust on said member to move the same downwardly in opposition to said counterbalancing means and to exert a thrust on said frame which is increased when the downward movement of the grappling member is arrested by engagement with a trailer to transfer the weight of the rear end of the tractor from said rear supporting wheels to said grappling member and lift the said rear end of the tractor, a slide mounted in said frame independently of said grappling member and beneath the same for movement forwardly and rearwardly, said slide having transversely spaced longitudinally extending tractor stabilizing stop members having stepped upper faces for engagement with a trailer to limit upward movement of the rear end of said tractor and restrict lateral rocking movements thereof, and manually operable means for adjusting said slide.

2. A tow tractor comprising a frame, transversely spaced supporting wheels mounted in said frame adjacent its rear end, a turntable mounted in said frame adjacent its forward end, a steering traction wheel journaled in said turntable, a steering handle attached to said turntable, a standard mounted on said frame rearwardly of said turntable, a trailer grappling lever pivoted to said standard and extending rearwardly therefrom, actuating means comprising a cylinder and piston that are pivotally connected, one to said lever and the other to said standard to exert opposing thrusts on said lever and said standard, counterbalancing means for normally holding the rear end of said lever in an elevated position, means for supplying fluid under pressure to said cylinder to actuate said piston in a direction to apply a downward thrust to the rear end of said lever to move the same downwardly in opposition to said counterbalancing means and to apply a lifting force to the rear end portion of said frame when the downward movement of said lever is arrested by engagement with a trailer, and means for relieving the pressure in said cylinder and for returning said lever to its elevated position.

3. A tow tractor comprising a frame, transversely spaced supporting wheels mounted in said frame adjacent its rear end, a turntable mounted in said frame adjacent its forward end, a steering traction wheel journaled in said turntable, a steering handle attached to said turntable, a standard mounted on said frame rearwardly of said turntable, a trailer grappling lever pivoted to said standard and extending rearwardly therefrom, actuating means comprising a cylinder and piston that are pivotally connected, one to said lever and the other to said standard to exert opposing thrusts on said lever and said standard, counterbalancing means for normally holding the rear end of said lever in an elevated position, means for supplying fluid under pressure to said cylinder to actuate said piston in a direction to apply a downward thrust to said lever to move the same downwardly in opposition to said counterbalancing means and to apply a lifting force to the rear end portion of said frame when the downward movement of said lever is arrested by engagement with a trailer, and means for limiting the upward movement of the rear end of the tractor comprising a rearwardly extending trailer engaging stop mounted in said frame.

4. A tow tractor comprising a frame, transversely spaced supporting wheels mounted in said frame adjacent its rear end, a turntable mounted in said frame adjacent its forward end, a steering traction wheel journaled in said turntable, a steering handle attached to said turntable, a standard mounted on said frame rearwardly of said turntable, a trailer grappling lever pivoted to said standard to swing vertically and extending rearwardly therefrom, actuating means comprising a cylinder and piston that are pivotally connected, one to said lever and the other to said standard to exert opposing thrusts on said lever and said standard, counterbalancing means for normally holding the rear end of said lever in an elevated position, means for supplying fluid under pressure to said cylinder to actuate said piston in a direction to apply a downward thrust to said lever to move the same downwardly in opposition to said counterbalancing means and to apply a lifting force to the rear end portion of said frame when the downward movement of said lever is arrested by engagement with a trailer, a slide mounted in said frame for movement forwardly and rearwardly beneath said lever, said slide having transversely spaced longitudinally extending tractor stabilizing stop members that are stepped and that progressively increase in height forwardly from their rear ends, and manually operable means for adjusting said slide.

5. A tow tractor comprising a frame, transversely spaced supporting wheels mounted in said frame adjacent its rear end, a turntable mounted in said frame adjacent its forward end, a steering traction wheel journaled in said turntable, a steering handle attached to said turntable, a standard mounted on said frame rearwardly of said turntable, a trailer grappling lever pivoted to said standard to swing vertically and extending rearwardly therefrom, actuating means connected to said lever and said frame to apply opposing thrusts to said lever and said frame, a slide mounted in said frame beneath said lever for forward and rearward movement, stepped trailer engaging stop members at opposite sides of said slide, a standard attached to said slide rearwardly of said frame standard, and an operating handle pivoted to the upper end of said slide standard extending forwardly past said frame standard.

References Cited in the file of this patent

UNITED STATES PATENTS

| | | |
|---|---|---|
| 1,233,849 | Culhane | July 17, 1917 |
| 1,424,788 | Westlake et al. | Aug. 8, 1922 |
| 1,739,999 | Wyllie | Dec. 17, 1929 |
| 1,870,689 | Remde | Aug. 9, 1932 |
| 2,311,864 | Parsons | Feb. 23, 1943 |
| 2,336,642 | Schreck | Dec. 14, 1943 |
| 2,513,718 | Gfrorer | July 4, 1950 |
| 2,541,755 | Gebron | Feb. 13, 1951 |
| 2,560,608 | Stoner | July 17, 1951 |
| 2,599,993 | Hill et al. | June 10, 1952 |
| 2,601,171 | Schreck | June 17, 1952 |
| 2,627,232 | Lauck | Feb. 3, 1953 |
| 2,669,314 | Quayle | Feb. 16, 1954 |